Oct. 22, 1968  S. L. TERRY  3,406,731

LOCKING MEANS

Filed Sept. 14, 1965  2 Sheets-Sheet 1

INVENTOR.
Sydney L. Terry
BY
Barnard, McGlynn & Reising
ATTORNEYS

INVENTOR.
Sydney L. Terry
BY
Barnard, McEllynn & Leising
ATTORNEYS

United States Patent Office 3,406,731
Patented Oct. 22, 1968

3,406,731
LOCKING MEANS
Sydney L. Terry, 58 Moross, Grosse
Pointe Farms, Mich. 48236
Filed Sept. 14, 1965, Ser. No. 487,288
12 Claims. (Cl. 151—30)

ABSTRACT OF THE DISCLOSURE

Fastening means for a nut and bolt assembly wherein a member is provided with radially inwardly extending legs which are adapted to first engage the threads of the bolt portion, and upon continuing rotation, rotationally deflect relative to the bolt member so that reverse rotation of the bolt member is resisted by such rotationally deflected legs. Such legs are caused to deflect rotationally by some means such as the interference between the inward ends of the legs and the bolt member along with rotation of the bolt member relative to the locking device.

This invention relates to locking means, and more particularly to locking means for a fastening assembly of the type where one part is rotated relative to another part, in order to secure said parts to one or more workpieces or to secure one or more workpieces together.

In securing a plurality of workpieces together, it is common to use a fastening assembly wherein one part is received in suitable apertures in the workpieces and a second part is received on the first part and rotated into fastening engagement. Typical of such fastening installations is a nut and bolt assembly, wherein the bolt extends through the workpiece or workpieces and is held in place by a nut, tightened against the workpiece and clamping the workpiece between the head of the bolt and the undersurface of the nut. It is often desirable in such installations to provide some locking means whereby the nut is positively secured relative to the bolt so that it will not loosen under vibration or load in holding the workpieces together. Other types of fastening installations may include unthreaded studs and some sort of rotatable member that is received on and secured to the stud in some manner.

There are available a great number of locking devices for rotative fastening installations. Such devices have different theories of operation and numerous different ways in which the locking is accomplished. Most are complicated and expensive to operate and install. Some rely upon spring pressure between the fastening members, such as between the threads on the nut and the threads on the bolt. Others rely upon deformation of one or the other members, either prior to installation or after installation, and some are only friction locks that are easily loosened through vibration or load on the fastening installation.

There are many things to be taken into account in deciding upon what type of locking means to utilize in any given installation. For example, in one type of installation it may be desirable to provide a prevailing torque type of locking device wherein a certain amount of torque must be overcome in assembling the fastening installation. This same feature may be objectionable in another installation because of the additional time required to assemble the fastener parts and the degree of torque necessary to be overcome in assembling the unit.

The device in which this invention is embodied comprises, generally, locking means having a plurality of radial arms extending inwardly toward one of the fastener members. The arms may be moved from one position to another, by relative rotation between the fastener members, the first position avoiding interference with the rotation of the members and the second being the locking position. As the fastening assembly is tightened, that is, as one member is rotated to its final position relative to the other, the locking arms are caused to engage one of the fastener members and deflect radially inwardly toward the one fastening member and into interfering engagement therewith, and deflect rotationally with continued rotation of the fastening assembly so that the ends of the arms positively engage the one fastening member, deflect over center and prevent reverse relative rotation of the one fastening assembly in an untightening direction. Such over center action of the arms causes a positive lock, being more than mere friction drag between the arms and the fastener member.

The device incorporating the locking means may be in the form of a washer member separate from the fastener members, such as the nut and bolt, or the locking means may be incorporated in one of the fastener members, such as the nut. The device is simple and inexpensive to manufacture, produce and utilize, and at the same time does not present the prevailing torque problem since the radially inwardly extending arms are so formed as to not interfere with the rotation of the fastener members in their free position. Thus, installation and assembly is simple and consumes very little time, at the same time providing a positive secure locking means for the two fastening members.

These and other advantages will become more apparent from the following description and drawings in which.

Figure 1:
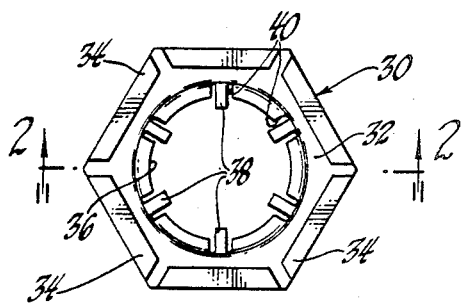
FIGURE 1 is a plan view of a preferred embodiment of the invention in which the locking means are incorporated in a washer-like structure.

Referring more particularly to the drawings, FIGURES 1 through 5 show a preferred embodiment of the invention in which the locking means are incorporated in a washer member separable from the members forming the fastener installation. In the drawings, a pair of workpieces, indicated generally by the numerals 10 and 12, are shown secured together by a fastening assembly including a bolt, indicated generally by the numeral 14, and a nut, indicated generally by the numeral 16. Bolt 14 includes an enlarged head 18 and a threaded shank 20, the shank 20 extending through suitable apertures 22 and 24 formed in the workpieces 10 and 12 respectively. Nut 16 has a central threaded aperture 26, the threads mating with the threads on the stud portion 20 of bolt 14. As is the usual practice, the nut 16 may be rotated about the bolt 14 with the threads in engagement to advance the nut 16 toward the workpiece 10 and to clamp the workpieces 10 and 12 between the enlarged head 18 on the bolt and the undersurface of the nut 16. Side faces 28 on nut 16 provide gripping surfaces for a suitable tool used to rotate the nut 16.

Figure 2:
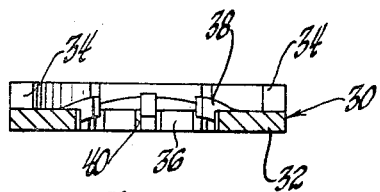
FIGURE 2 is a cross-sectional view of the structure illustrated in FIGURE 1, taken substantially along the line 2—2 of FIGURE 1, and looking in the direction of the arrows.
Figure 3:
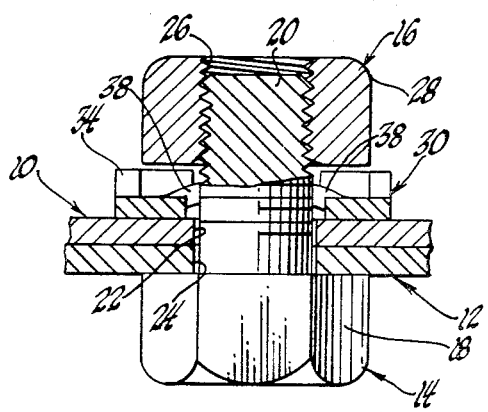
FIGURE 3 is a view of a fastener installation utilizing a locking device such as illustrated in FIGURES 1 and 2, with parts broken away and in section, and indicating the position of the parts before the final assembly.
Figure 4:
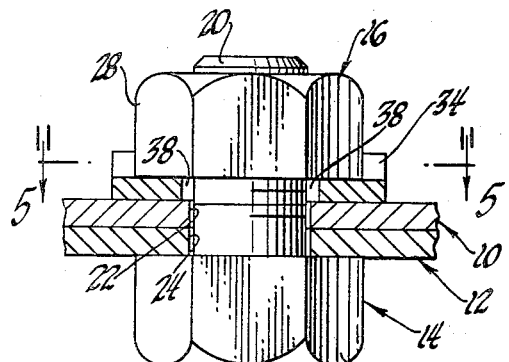
FIGURE 4 is a view of a fastener assembly such as illustrated in FIGURE 3, with parts broken away and in section, showing the position of the parts in fully tightened condition.

The locking device that locks the nut 16 in its position on the threaded stud 20 of the bolt 14 takes the form of a washer, indicated generally by the numeral 30. Washer member 30 includes a generally planar body portion 32, which may be of polygonal shape, having formed therefrom a plurality of upwardly extending flanges 34 adapted to engage the side surfaces 28 of the nut 16 and prevent relative rotation between the washer structure 30 and the nut 16. One or more side flanges 34 may be provided, and alternatively the side flanges may be bent upwardly at the time of installation rather than during the formation of the washer structure 30. The body portion 32 is provided with a generally circular aperture 36 which is larger in diameter than the diameter of the stud portion 20 of the nut 14. Formed out of the body portion 32 are a plurality of radially inwardly extending arms 38 formed by slots 40 formed in the body portion 32. The radial arms 38 are bent out of the plane of the body portion 32, as best illustrated in FIGURE 2, so that in the free position thereof the ends of the arms 38 will not interfere with the threaded stud 20 as the washer is placed thereover.

In the assembly of the nut 16, bolt 14 and washer 30, in appropriate positions relative to the workpieces 10 and 12, the washer 30 is placed over the threaded stud portion 20 of the bolt 14 and between the workpiece 10 and the nut 16. The nut 16 is rotated to a point at which the washer 30 is engaged therewith and the side flanges 34 overlap the side faces 28 of the nut 16. The nut 16 and washer 30 are then rotated together relative to the bolt 14 and continued rotation of nut 16 and washer 30 advance the subassembly toward the workpiece 10. When the bottom surface of the washer 30 engages the workpiece 10, continued rotation of the nut 16 deflects the arms 38 downwardly toward the body portion 32 of the washer 30, thus decreasing the dimension between the ends of the arms 38. Such decreased dimension causes interference between the arms 38 and the threads on the bolt 14, further rotation causing rotational deflection of the arms 38 from their radial free-state position. The nut and washer 30 are rotated to a desired torque, and until the radial arms are fully deflected and the ends of the arms 38 are in over center condition to fully interfere with the threads on the stud portion 20. It will be apparent that reverse relative rotation between the stud portion 20 and the washer 30, and consequently the nut 16, will require the radial arms 38 to deflect back over center, radially compressing against the columnar strength of the arms, thus tending the cause the ends of arms 38 to bite more deeply into the threads on the threaded portion 20. Thus, the washer 30 will be securely locked on the threaded stud 14 and the side flanges 34, in engagement with the side faces 28 of the nut 16, prevent relative rotation between the nut 16 and the washer 30. In this manner, relative rotation between the nut 16 and the bolt 14 is effectively prevented.

Figure 6:
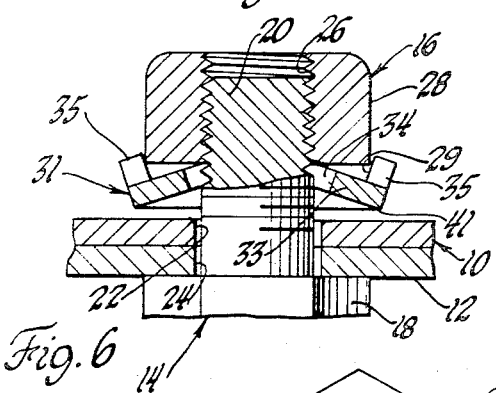
FIGURE 6 is a view of a modified form of the assembly illustrated in FIGURES 1–5, with parts broken away and in section, showing the nut and the washer-like structure incorporated as a subassembly.
Figure 5:
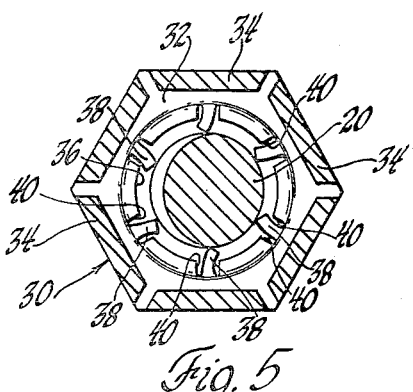
FIGURE 5 is a cross-sectional view of the fastener assembly illustrated in FIGURE 4, taken substantially along the line 5—5 of FIGURE 4, and looking in the direction of the arrows to indicate the operation of the locking means.
Figure 7:
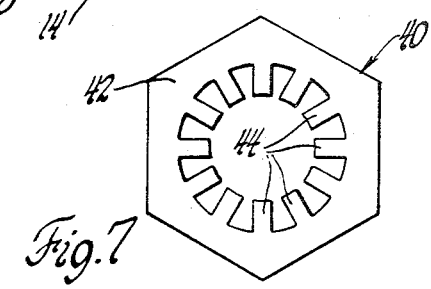
FIGURE 7 is a plan view of another preferred embodiment of the invention wherein the locking means are incorporated in a nut structure.

Another preferred embodiment of the invention is illustrated in FIGURE 6, wherein the nut and washer are preassembled so that they may be transported from place to place together. The workpieces 10 and 12 are to be secured together by the bolt 14 and nut 16, the locking structure, indicated generally by the numeral 31, being similar to the washer 30 of FIGURES 1–5. Washer member 31 includes a conical body portion 33, from the edges of which are formed side flanges 35 and radially inwardly extending arms 39. In its conical form, the inner surfaces of the side flanges 35 frictionally engage the lower peripheral edge 29 of the nut 16 to hold the washer 31 on the nut 16. Such subassembly conveniently keeps the nut and washer together prior to installation on the bolt 14.

Upon assembly of the nut and washer combination, the inner ends of the arms 38 avoid interference with the threaded stud 20 until such time as the lower peripheral edge 41 of the washer 31 engages the upper surface of workpiece 10. Continued rotation of the nut 16 causes the washer body 33 to flatten between nut 16 and workpiece 10, in turn causing the radial arms 39 to deflect downwardly and inwardly into interference with the threaded stud 20. Continued rotation causes arms 39 to deflect rotationally to their over center locking position to prevent reverse relative rotation of the nut 16 relative to the bolt 14, with flattening of the body portion 33 of the washer 31, the side flanges 35 deflect upwardly into generally parallel relation with the side faces 28 of nut 16, thus effectively and positively preventing relative rotation between the nut 16 and the washer 31.

Figure 8:
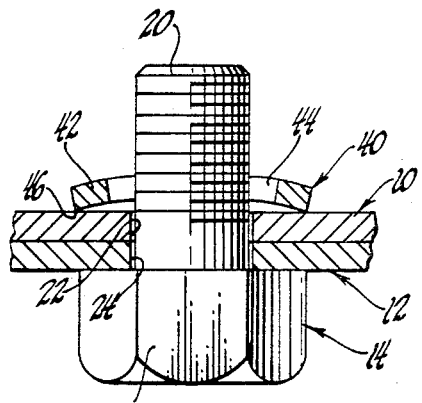
FIGURE 8 is a view of a fastening installation utilizing a locking nut device such as illustrated in FIGURE 7, with parts broken away and in section.
Figure 9:
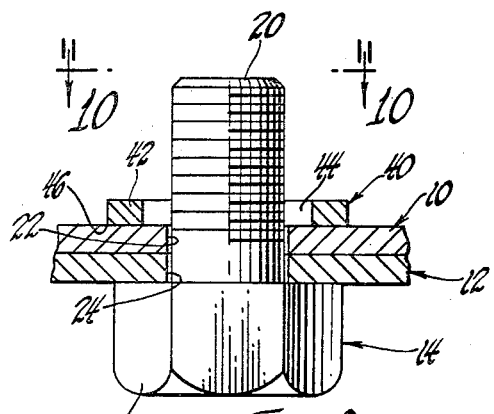
FIGURE 9 is a view of a fastening installation utilizing a nut structure such as illustrated in FIGURE 7, with parts broken away and in section, wherein the parts are shown in fully assembled position.

FIGURES 7 through 10 illustrate still another preferred embodiment of the invention in which the workpieces 10 and 12, provided with apertures 22 and 24 respectively, are held together by a bolt 14, having an enlarged head 18 and a threaded portion 20, and a nut structure, indicated generally by the numeral 40. Nut 40 includes a peripheral body portion 42 of any suitable shape to permit the use of a necessary tool for rotating the nut 40 relative to the bolt 14, and a plurality of inwardly extending radial arms 44. The peripheral body portion 42 and the arms 44 are so formed that the arms 44 extend out of the plane of the peripheral edge 46 of the nut 40, as by making the nut spherical, as illustrated in FIGURE 8. The ends of the arms 44 are threaded to have a mating thread with the thread on the stud portion 20 of the bolt 14, and in the free position the ends of the arms are so located as to rotate freely about the threaded stud portion 20 and advance therealong in the well known manner.

Figure 10:
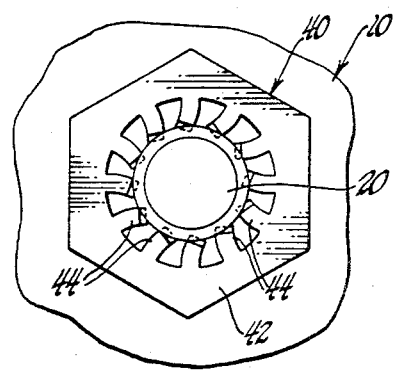
FIGURE 10 is a plan view of the fastener installation illustrated in FIGURE 9, illustrating the position of the locking means in the structure.
Figure 11:
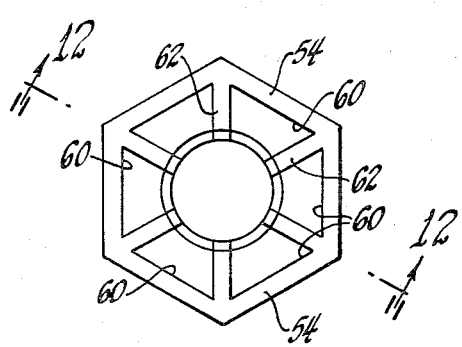
FIGURE 11 is a plan view of yet another preferred embodiment of the invention in which the locking means are incorporated in another type of nut structure.
Figure 12:
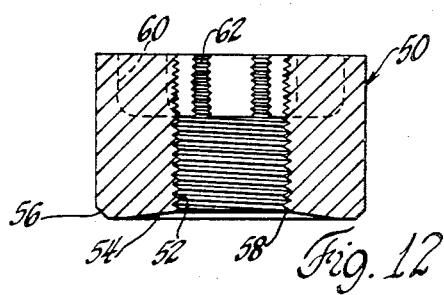
FIGURE 12 is a cross-sectional view of the modification illustrated in FIGURE 11, taken substantially along the line 12—12 of FIGURE 11, and looking in the direction of the arrows.
Figure 13:
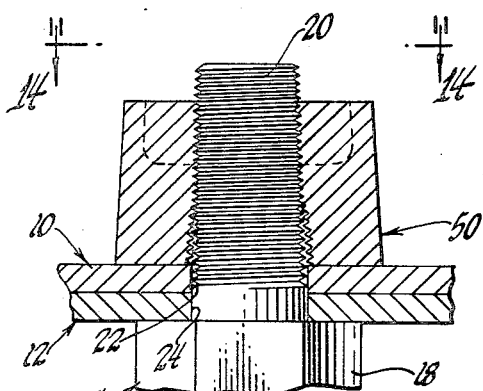
FIGURE 13 is a view of a fastener installation in which a nut such as illustrated in FIGURES 11 and 12 is utilized, with parts broken away and in section, showing the parts in fully assembled position.
Figure 14:
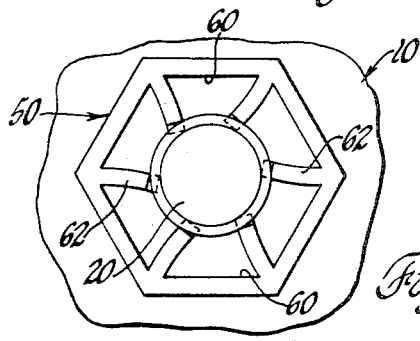
FIGURE 14 is a plan view of the fastener installation illustrated in FIGURE 13, showing the locking means in fully assembled position.

In completing the nut and bolt assembly, the bolt 14 is first disposed within the apertures 22 and 24 of the workpieces 10 and 12, and the nut 40 is freely rotated along the stud portion 20 to a position wherein the peripheral under edge 46 engages the workpiece 10. Upon further rotation of the nut 40, the body portion 42 and radial arms 44 are deflected axially of the bolt 14 toward the workpiece 10, causing increasing interference between the radial arms 44 and the threaded portion 20 of the nut 16. Upon continued rotation, the radial arms 44 will rotationally deflect, as best illustrated in FIGURE 10, from their radial position to the over center position, thus causing a lock between the nut 40 and the threaded stud 20 on the bolt 14. Any attempt to rotate the nut 40 in the reverse direction causes the radial arms to more tightly bite into the threaded portion 20 thus preventing such reverse relative rotation.

Yet another preferred embodiment of the invention is illustrated in FIGURES 11 through 14. As thereshown, the workpieces 10 and 12, having apertures 22 and 24 respectively, are to be secured by means of a bolt 14 having an enlarged head 18 and a threaded stud portion 20 and a nut structure, indicated generally by the numeral 50. Nut 50 has a central threaded aperture 52, extending completely therethrough, and may be of any suitable shape so as to provide faces 54 for gripping by a suitable tool.

The lower surface of nut 50, that is, the surface which engages the workpiece 10, is provided with a conical undercut 54 so that the peripheral edge 56 of the nut 50 is axially spaced from the peripheral edge 58 of the threaded aperture 52. At the opposite end of nut 50 a plurality of slots or grooves 60 are formed in the body of the nut 50, the grooves being annularly spaced to provide a plurality of inwardly extending radial arms 62, having the continuation of the threads in the bore 52 formed in the inner edges thereof. Arms 62 are radially disposed so that the threaded bore 52 is substantially uninterrupted throughout its entirety from end to end of the nut 50.

Upon assembling the nut and bolt structure 50–14 on opposite sides of the workpieces 10 and 12, the nut 50 may be freely rotated along the threaded stud portion 20 of the bolt 14 until the lower peripheral edge 56 engages the surface of the workpiece 10. Further rotation of the nut 50 causes the sides of the nut 50 to deflect inwardly, due to the conical undercut 54 in the lower surface of the nut, thus causing the opposite end of the nut to deflect radially inwardly, as shown in exaggerated form in FIGURE 13. Such inward deflection of the upper end of nut 50 causes the radial arms 62 to interfere with the threads on the threaded stud 20 of bolt 14 and causing the rotational deflection of the arms 62 out of the radial free-state position and into interfering relation with the threaded portion 20 of the bolt 14. Attempted reverse rotation of the nut 50 relative to the bolt 14 causes the radial arms 62 to bite more deeply into the threaded stud 20 thus resisting such reverse rotation.

In each of the embodiments heretofore described, the inwardly extending radial arms are, in their free position, in noninterfering relation with the threaded portion of the bolt to permit free rotation of the nut relative to the bolt from initial installation to the final tightening. In each of the embodiments heretofore described, a two-step deflection process takes place, one step being the inward deflection of the arms relative to the bolt structure and the other being the rotational deflection of the arms from the radials to the over center relationship. Thus, there is no prevailing torque in the locking structure, whether used as a separate washer member or as the nut itself, and the lock in final assembly is positive to prevent reverse rotation either due to vibration or load. In any of the embodiments heretofore described, the locking structure is simple and inexpensive to incorporate, either as a separate washer member or as part of the nut structure, and simple and inexpensive to install in the final assembly. Although the foregoing description and drawings relate to right hand thread operation, it will be apparent that the locking means are equally adaptable to left hand rotational fastening members.

In each case, the relatively large forces generated by the final seating of the nut are used to cause radial deflection inward of radial arms, which are constrained to rotate with the nut and which bear lightly either on the outer diameter or the threads of the bolt. As the legs move radially inward due to the tightening forces, an interference between the legs and the bolt is set up which in turn causes the radial legs to bend in the plane of rotation in such a way that they drag on the bolt.

For positive locking, the final dragging angle of contact with the bolt must be small enough so that upon reverse rotation, the legs do not slide on the bolt but rather dig into the bolt and have to straighten out as the nut is loosened, thus inducing further compression and increased interference between the legs and the bolt until the legs pass over center and again drag on the bolt, only this time in the other direction. It may be seen that in each of the locking devices specified, this angle of interference or locking angle may be easily controlled and varied by the proper selection of the base cone angle, which controls the amount of radial deflection of the radial arms, as well as by the width and length of the radial legs and other factors in the geometry and by the material employed.

It may also be readily seen that the critical drag angle of the legs may be made different for different opposite legs by purposely making the inner diameter of the radial legs contacting the bolt slightly eccentric. By this means, the effect of stacking tolerances could be overcome and the user assured that there will be some over center locking action at the time of the initial loosening of the bolt.

Changes and modifications will occur to those having skill in the art after having had reference to the foregoing description and drawings. However, it is not intended to limit the scope of the invention by the foregoing, but by the scope of the appended claims.

The embodiments of the invention in which an exclusive property or privilege is claimed are defined as follows:

1. A one piece locking device for a fastening installation having a bolt and comprising: a solid body having a central aperture therein for disposition on and axially along the bolt, a plurality of resiliently deflectable arms having first ends thereof connected directly to said body and extending from said body radially into said aperture to inward distal ends, said arms being generally of the same circumferential width at said first ends as adjacent said distal ends with the radial extent of said arms being greater than the circumferential extent thereof to allow rotational deflection thereof, the longitudinal axis of each arm being a radial of the central axis of said aperture, said arms being axially inclined so as to be movable radially inward to engage the bolt upon axial depression thereof, said arms being circumferentially spaced a sufficient distance so as to be deflectable rotationally about the axis of the bolt from said radial position to an off-center non-radial position in tight engagement with the bolt upon relative rotation with the bolt, said non-radial position being in the direction of rotation of the bolt relative thereto, said body surrounding said aperture and providing a rigid support to prevent said first ends of said arms from moving radially outwardly.

2. A locking device as set forth in claim 1 wherein said device is a washer adapted to be disposed between a nut and the head of the bolt.

3. A locking device as set forth in claim 2 including means engageable with the nut to prevent relative rotation between the washer and the nut.

4. A locking device as set forth in claim 3 wherein said means includes an axially extending flange on the periphery of said body to engage the nut and cause rotation and axial movement of said washer therewith to move said arms to said off-center non-radial position.

5. A locking device as set forth in claim 4 wherein said body is generally conical.

6. A locking device as set forth in claim 4 wherein said body is generally planar and said arms extend axially away from the plane of said body and move axially toward said plane and radially into engagement with the bolt.

7. A locking device as set forth in claim 6 wherein said arms extend arcuately out of the plane of said body.

8. A locking device as set forth in claim 1 wherein said inward ends of said arms are threaded to mate with threads on the bolt.

9. A locking device as set forth in claim 8 wherein said body is generally spherical.

10. A one piece locking device for a fastening installation having a bolt and comprising: a solid body having a central aperture therein for disposition on and axially along the bolt, a plurality of resiliently deflectable arms having first ends thereof connected directly to said body and extending from said body radially into said aperture to inward distal ends, said arms being generally of the same circumferential width at said first ends as adjacent said distal ends with the radial extent of said arms being greater than the circumferential extent thereof to allow rotational deflection thereof, the longitudinal axis of each arm being a radial of the central axis of said aperture, said arms being movable radially inward to engage the bolt, said arms being circumferentially spaced a sufficient distance so as to be deflectable rotationally about the axis of the bolt from said radial position to an off-center nonradial position in tight engagement with the bolt upon relative rotation with the bolt, said nonradial position being in the direction of rotation of the bolt relative thereto, said body surrounding said aperture and providing a rigid support to prevent said first ends of said arms from moving radially outwardly, said body having threads in said aperture to define a nut, said arms being disposed at a first end of said nut and the second end of said nut is nonplanar with the central portion being recessed so that said radial arms are deflected inwardly as said nut is tightened to cause interference between the ends of said arms and the bolt to rotationally deflect said arms into said recess from said portion.

11. A locking device as set forth in claim 10 including a recess in said first end of said nut to define a portion of said body extending about the periphery thereof, said arms extending into said recess from said portion of said body.

12. A locking device as set forth in claim 11 wherein the inner ends of said arms are threaded with the same threads as said aperture in said nut.

References Cited

UNITED STATES PATENTS

| | | | |
|---|---|---|---|
| 522,937 | 7/1894 | Fougere | 151—15 |
| 986,255 | 3/1911 | Whitney | 151—30 |
| 1,421,638 | 7/1922 | Wheeler. | |
| 2,294,056 | 8/1942 | Thompson | 151—14 |
| 2,294,057 | 8/1942 | Thompson | 151—14 |
| 2,294,059 | 8/1942 | Thompson | 151—14 |

FOREIGN PATENTS 485,849   10/1953   Italy.

CARL W. TOMLIN, *Primary Examiner.*

RAMON S. BRITTS, *Assistant Examiner.*